US009619371B2

(12) United States Patent
Adderly et al.

(10) Patent No.: US 9,619,371 B2
(45) Date of Patent: Apr. 11, 2017

(54) CUSTOMIZED APPLICATION PERFORMANCE TESTING OF UPGRADED SOFTWARE

(71) Applicant: International Business Machines Corporation, Armonk, NY (US)

(72) Inventors: Darryl M. Adderly, Morrisville, NC (US); Jonathan W. Jackson, Durham, NC (US); Ajit Jariwala, Cary, NC (US); Eric B. Libow, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 14/687,958

(22) Filed: Apr. 16, 2015

(65) Prior Publication Data
US 2016/0306735 A1    Oct. 20, 2016

(51) Int. Cl.
*G06F 9/445* (2006.01)
*G06F 11/36* (2006.01)
(Continued)

(52) U.S. Cl.
CPC .......... *G06F 11/3664* (2013.01); *G06F 8/65* (2013.01); *G06F 8/71* (2013.01); *G06F 11/368* (2013.01); *H04L 67/34* (2013.01)

(58) Field of Classification Search
CPC .... G06F 8/65; G06F 11/3664; G06F 11/3692; G06F 11/3409
See application file for complete search history.

(56) References Cited

U.S. PATENT DOCUMENTS 6,606,740 B1    8/2003  Lynn et al.
7,356,679 B1    4/2008  Le et al.
(Continued)

FOREIGN PATENT DOCUMENTS

EP        2270725 A2    1/2011
WO    2014088398 A1    6/2014

OTHER PUBLICATIONS

Eljona Proko and Ilia Ninka, Analysis and Strategy for the Performance Testing in Cloud Computing, Jul. 2012, Global Journals Inc., vol. 12, retrieved online on Nov. 19, 2016, pp. 1-5. Retrieved from the Internet: <URL: https://globaljournals.org/GJCST_Volume12/ 2-Analysis-and-Strategy-for-the-Performance-Testing.pdf>.*
(Continued)

*Primary Examiner* — Hanh T Bui
(74) *Attorney, Agent, or Firm* — Robert C. Bunker (57) ABSTRACT

A method for providing a plurality of customized remote environments for application performance testing is provided. The method may include identifying a plurality of client customizations associated with a client application. The method may also include identifying a plurality of client hardware configurations associated with the client application. The method may further include populating a plurality of upgraded versions of the client application. Additionally, the method may include provisioning at least one remote environment. The method may also include applying the plurality of client customizations of the client application to the plurality of upgraded versions of the at least one client application. The method may further include deploying the plurality of upgraded versions of the at least one client application on at least one environment, whereby the deployed plurality of upgraded versions has the applied identified plurality of client customizations of the at least one client application.

11 Claims, 6 Drawing Sheets

(51) Int. Cl.
   *G06F 9/44* (2006.01)
   *H04L 29/08* (2006.01)

(56) References Cited

U.S. PATENT DOCUMENTS

| | | | |
|---|---|---|---|
| 7,530,079 | B2 | 5/2009 | Stubbs et al. |
| 7,945,907 | B2 | 5/2011 | Dreiling et al. |
| 8,245,223 | B2 | 8/2012 | Bhatia et al. |
| 8,255,871 | B1 | 8/2012 | Kompella et al. |
| 8,341,590 | B1 | 12/2012 | Poole |
| 8,499,352 | B2 | 7/2013 | Mathur et al. |
| 8,819,658 | B2* | 8/2014 | Balasubramanian ..... G06F 8/65 717/168 |
| 8,839,222 | B1* | 9/2014 | Brandwine ............... G06F 8/65 717/168 |
| 9,274,782 | B2 | 3/2016 | Adderly et al. |
| 2002/0091559 | A1 | 7/2002 | Beniyama et al. |
| 2005/0198639 | A1 | 9/2005 | Matsui |
| 2006/0069599 | A1 | 3/2006 | Hatoun et al. |
| 2006/0271925 | A1* | 11/2006 | Schuelein ................. G06F 8/65 717/168 |
| 2007/0092783 | A1 | 4/2007 | Gibbons |
| 2008/0126987 | A1 | 5/2008 | Meschian et al. |
| 2009/0019271 | A1 | 1/2009 | Kawakami |
| 2009/0037870 | A1 | 2/2009 | Santos-Gomez |
| 2009/0064090 | A1 | 3/2009 | Anonsen et al. |
| 2010/0049740 | A1 | 2/2010 | Iwase et al. |
| 2010/0131533 | A1 | 5/2010 | Ortiz |
| 2010/0131928 | A1 | 5/2010 | Parthasarathy et al. |
| 2010/0162232 | A1* | 6/2010 | Bhatia ................. G06F 9/44526 717/178 |
| 2011/0131545 | A1 | 6/2011 | Patrascu et al. |
| 2011/0225565 | A1 | 9/2011 | van Velzen et al. |
| 2011/0314466 | A1 | 12/2011 | Berg et al. |
| 2012/0116836 | A1 | 5/2012 | Flores et al. |
| 2012/0180045 | A1* | 7/2012 | Bhogal ..................... G06F 9/50 718/1 |
| 2013/0054299 | A1 | 2/2013 | Deshpande et al. |
| 2013/0185348 | A1 | 7/2013 | Hall et al. |
| 2014/0026119 | A1* | 1/2014 | Dejana ..................... G06F 8/20 717/124 |
| 2014/0040976 | A1 | 2/2014 | Furuichi et al. |
| 2014/0165135 | A1 | 6/2014 | Fitterer et al. |
| 2014/0372533 | A1 | 12/2014 | Fu et al. |
| 2015/0301818 | A1* | 10/2015 | Voronkov ................. G06F 8/65 717/168 |

OTHER PUBLICATIONS

Emanuel F. Coutinho et al., How to deploy a Virtual Learning Environment in the cloud, Apr. 2014, ACM, retrieved online on Nov. 19, 2016, pp. 1-4. Retrieved from the Internet: <URL: http://delivery.acm.org/10.1145/2600000/2590675/a25-coutinho.pdf?>.*

Adderly et al., "Automated Computer Application Update Analysis," Filed on Dec. 20, 2013, p. 1-26, U.S. Appl. No. 14/136,593.

Alur et al., "LinkIntegrity+ : A Web Asset Integrity Solution," IBM Almaden Research Center, 2008, 10 pages, San Jose, CA.

Gil et al., "Mind Your Metadata: Exploiting Semantics for Configuration, Adaptation, and Provenance in Scientific Workflows," Proceedings of the Tenth International Semantic Web Conference (ISWC), Oct. 23-27, 2011, 16 pages, Bonn, Germany.

Gil et al., "Workflow Matching Using Semantic Metadata," Proceedings of the Fifth International Conference on Knowledge Capture (K-CAP), Sep. 1-4, 2009, 8 pages, ACM, Redondo Beach, California.

Inamoto, "Modeling of Object Behavior and Scheduling in Production Workflow," Advances in Production Management Systems, 1996, p. 407-414, Mitsubishi Electric Corporation.

Mell et al., "The NIST Definition of Cloud Computing," National Institute of Standards and Technology, Information Technology Laboratory, Oct. 7, 2009, 2 pages, Version 15.

Wang, "Design of Collaborative Workflow Model Based on Web Service," IEEE, 2010, 4 pages, DongBei University of Finance and Economics.

Wikipedia, "Amazon Elastic Compute Cloud," Wikipedia: the Free Encyclopedia, Last Modified on Dec. 9, 2014, p. 1-10, http://en.wikipedia.org/wiki/Amazon_Elastic_Compute_Cloud, Accessed on Feb. 3, 2015.

Wikipedia, "Google Compute Engine," Wikipedia: the Free Encyclopedia, Last Modified on Dec. 1, 2014, p. 1-8, http://en.wikipedia.org/wiki/Google_Compute_Engine, Accessed on Feb. 3, 2015.

Wikipedia, "Microsoft Azure," Wikipedia: the Free Encyclopedia, Last Modified on Jan. 29, 2015, p. 1-10, http://en.wikipedia.org/wiki/Microsoft_Azure, Accessed on Feb. 3, 2015.

Gil et al., "Examining the Challenges of Scientific Workflows," IEEE Computer, Dec. 2007, p. 24-32, vol. 40, No. 12.

Hauder et al., "A Framework for Efficient Data Analytics through Automatic Configuration and Customization of Scientific Workflows," Seventh IEEE International Conference on eScience, 2011, p. 379-386, IEEE Computer Society.

Jensen et al., "Using Characteristics of Computational Science Schemas for Workflow Metadata Management," IEEE congress on Services—Part I, 2008, p. 445-452, IEEE Computer Society.

* cited by examiner

CUSTOMIZED APPLICATION PERFORMANCE TESTING OF UPGRADED SOFTWARE

CROSS REFERENCE TO RELATED APPLICATION

This application is related to the following commonly-owned, co-pending United States patent application filed on Dec. 20, 2013, the contents and disclosure of which is expressly incorporated by reference herein in its entirety: U.S. patent application Ser. No. 14/136,593 for "AUTOMATED COMPUTER APPLICATION UPDATE ANALYSIS".

BACKGROUND

The present invention relates generally to the field of computing, and more specifically, to application performance testing.

Computer software applications may typically have original content that is included with the computer applications. Furthermore, developers of the computer applications may generally create original workflows that are included in the computer applications. In turn, users may be allowed to customize the original workflows to fit their personal or business needs. For example, when users install the computer applications on the user's hardware configurations, users may find that the original workflows do not fully meet their requirements, and therefore, may modify one or more of the original workflows to create customized workflows. Additionally, the computer applications may be updated from version to version. Therefore, the original workflows may be updated to create updated workflows, and the updated workflows may provide additional functionality and features not previously met by the original workflows. Also, the user's hardware configurations used to support the original and customized workflows of the application may require upgrading to support the updated versions of the computer applications.

SUMMARY

A method for providing a plurality of customized remote environments for application performance testing is provided. The method may include identifying a plurality of client customizations associated with at least one client application. The method may also include identifying a plurality of client hardware configurations associated with the least one client application. The method may further include populating a plurality of upgraded versions of the at least one client application, wherein the populating is based on the at least one client application. Additionally, the method may include provisioning at least one remote environment based on the populated plurality of upgraded versions. The method may also include applying the identified plurality of client customizations associated with the at least one client application to the populated plurality of upgraded versions of the at least one client application. The method may further include deploying the plurality of upgraded versions of the at least one client application on the at least one customized remote environment, wherein the deployed plurality of upgraded versions has the applied identified plurality of client customizations of the at least one client application.

A computer system for providing a plurality of customized remote environments for application performance testing is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include identifying a plurality of client customizations associated with at least one client application. The method may also include identifying a plurality of client hardware configurations associated with the least one client application. The method may further include populating a plurality of upgraded versions of the at least one client application, wherein the populating is based on the at least one client application. Additionally, the method may include provisioning at least one remote environment based on the populated plurality of upgraded versions. The method may also include applying the identified plurality of client customizations associated with the at least one client application to the populated plurality of upgraded versions of the at least one client application. The method may further include deploying the plurality of upgraded versions of the at least one client application on the at least one remote environment, wherein the deployed plurality of upgraded versions has the applied identified plurality of client customizations of the at least one client application.

A computer program product for providing a plurality of customized remote environments for application performance testing is provided. The computer program product may include one or more computer-readable storage devices and program instructions stored on at least one of the one or more tangible storage devices, the program instructions executable by a processor. The computer program product may include program instructions to identify a plurality of client customizations associated with at least one client application. The computer program product may also include program instructions to identify a plurality of client hardware configurations associated with the at least one client application. The computer program product may further include program instructions to populate a plurality of upgraded versions of the at least one client application, wherein the populating is based on the at least one client application. Additionally, the computer program product may include program instructions to provision at least one remote environment based on the populated plurality of upgraded versions. The computer program product may also include program instructions to apply the identified plurality of client customizations associated with the at least one client application to the populated plurality of upgraded versions of the at least one client application. The computer program product may further include program instructions to deploy the plurality of upgraded versions of the at least one client application on the at least one remote environment, wherein the deployed plurality of upgraded versions has the applied identified plurality of client customizations of the at least one client application.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly, to application performance testing. The following described exemplary embodiments provide a system, method and program product for providing cloud accessible testing environments for testing client customizations of computer applications deployed on one or more updated versions of the computer applications as well as on one or more hardware configurations. Additionally, the present embodiment has the capacity to improve the technical field of application performance testing by allowing users to deploy the user's customizations of applications on one or more updated versions of the backing software packages for the application as well as on one or more hardware configurations.

As previously described with respect to application performance testing, computer application developers may include original workflows on the computer applications. Users may be allowed to customize the original workflows to create customized workflows. For example, the customized workflows may be modified versions of the original workflows and provide customized functionality, which may be more suitable to the needs of the user. However, updated versions of the computer applications, which may include updated functionality to the original workflows, may become available to the computer applications. Therefore, the customized functionality of the customized workflows may need to be preserved when installing the updated functionality to the original workflows. As such, before committing money and manpower to the upgraded versions of the application, users and administrators may want to preserve and test the client customizations of the computer applications by deploying the client customizations on one or more upgraded versions of the computer applications on one or more cloud environments. Thus, it may be advantageous, among other things, to provide a cloud accessible testing environment for testing the performance of computer applications deployed on one or more updated versions of the computer applications with client customizations, as well as on one or more hardware configurations. Therefore, the clients of the customized applications may access, assess performance, and compare different deployments of the custom applications on the updated solutions.

According to at least one embodiment of the present invention, cloud accessible testing environments may be provided to test the application performance of client customized applications deployed on one or more updated versions of the applications as well as on one or more hardware configurations. In one embodiment, the client customizations of the applications may be identified. Furthermore, according to one implementation, the client hardware configurations may be identified. Then, according to one implementation, one or more remote/cloud environments may be provisioned. Thereafter, the client customizations of the applications may be applied to the updated versions of the application on the provisioned remote/cloud environments one or more updated versions of the application. Furthermore, the updated versions of the application applying the client customizations of the applications may be deployed on the provisioned remote/cloud environments. Thus, the client customizations of the applications may be merged with the one or more updated versions of the computer application. In addition, temporary access may be provided to the one or more remote/cloud environments to allow users and administrators to test and analyze the performance of the merged application on each of the one or more remote/cloud environments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for providing cloud accessible testing environments for testing client customizations of customized applications deployed on one or more updated versions of the customized applications, as well as on one or more hardware configurations.

According to at least one implementation, client customizations of applications may be identified. Additionally, the hardware configurations of the client environment on which the client customizations of the applications are run may be identified as well. Furthermore, one or more updated versions of the applications may be populated and presented to the user. Thereafter, one or more remote/cloud environments, having different hardware and software platforms, may be provisioned. Then, the client customizations of the applications may be applied and merged to the upgraded versions of the application. Then, one or more of the merged applications may be deployed on the provisioned remote environments. Furthermore, access may be provided to the one or more remote environments to allow users and client system administrators to test and analyze the performance of the merged application on each of the one or more remote environments.

Figure 1:
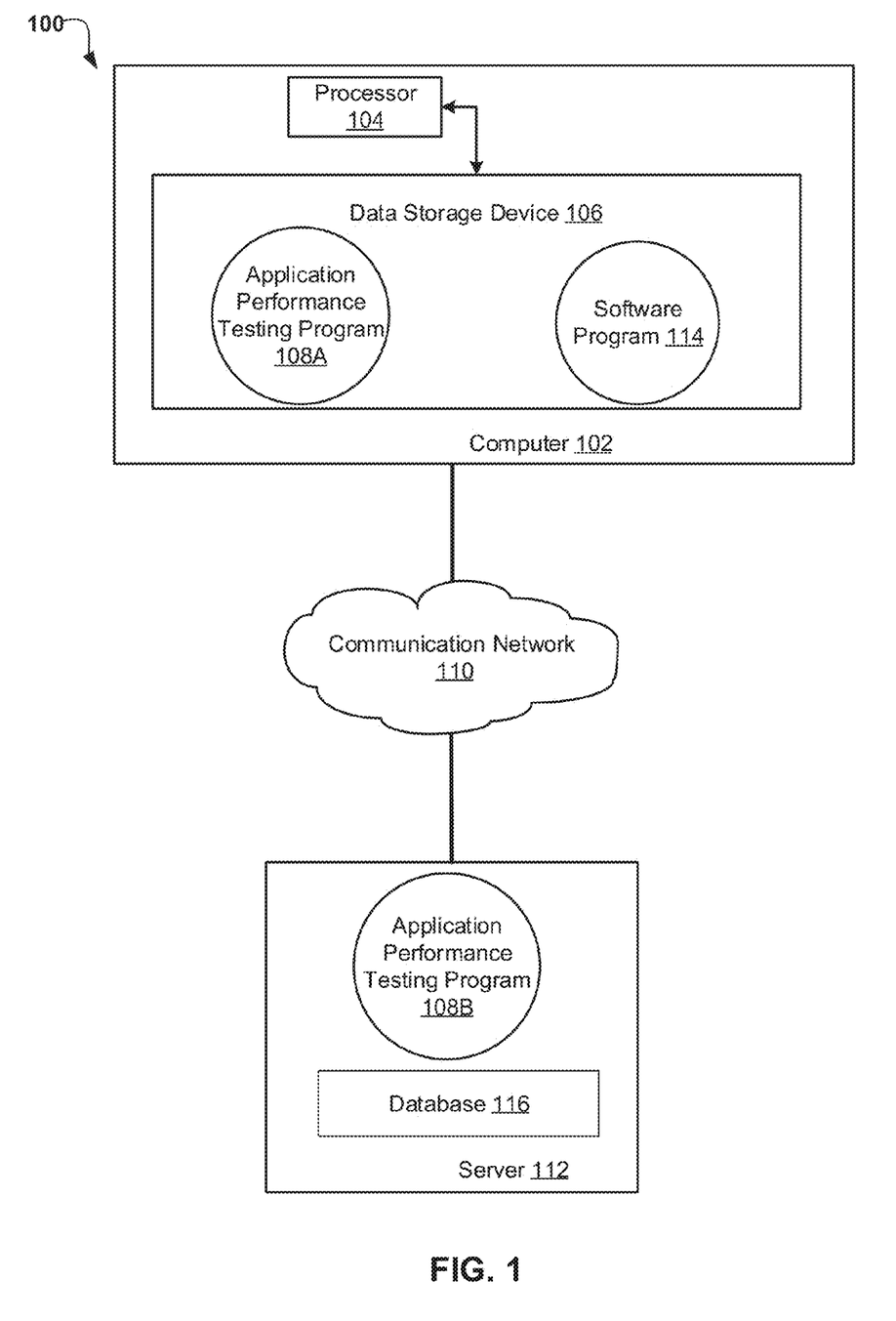
FIG. 1 illustrates a networked computer environment according to one embodiment.

Referring now to FIG. 1, an exemplary networked computer environment 100 in accordance with one embodiment is depicted. The networked computer environment 100 may include a computer 102 with a processor 104 and a data storage device 106 that is enabled to run an application performance testing program 108A and a software program 114. The software program 114 may be an application program such as an internet browser and an email program. The application performance testing program 108A may communicate with the software program 114. The networked computer environment 100 may also include a server 112 that is enabled to run an application performance testing program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 4, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the application performance testing program 108A, 108B may interact with a database 116 that may be embedded in various storage devices, such as, but not limited to a mobile device 102, a networked server 112, or a cloud storage service.

According to the present embodiment, a program, such as an application performance testing program 108A and 108B may run on the client computer 102 or on the server computer 112 via a communications network 110. The application performance testing program 108A, 108B may provide cloud accessible testing environments to test the application performance of client customizations of applications deployed on one or more updated versions of the applications as well as on one or more hardware configurations. For example, a user using a computer, such as computer 102, may use a communication network 110, that interacts with the application performance testing program 108A, 108B, and a database 116, to provide a cloud accessible testing environment, and to deploy client customizations of applications on one or more updated versions of the applications.

Figure 2:
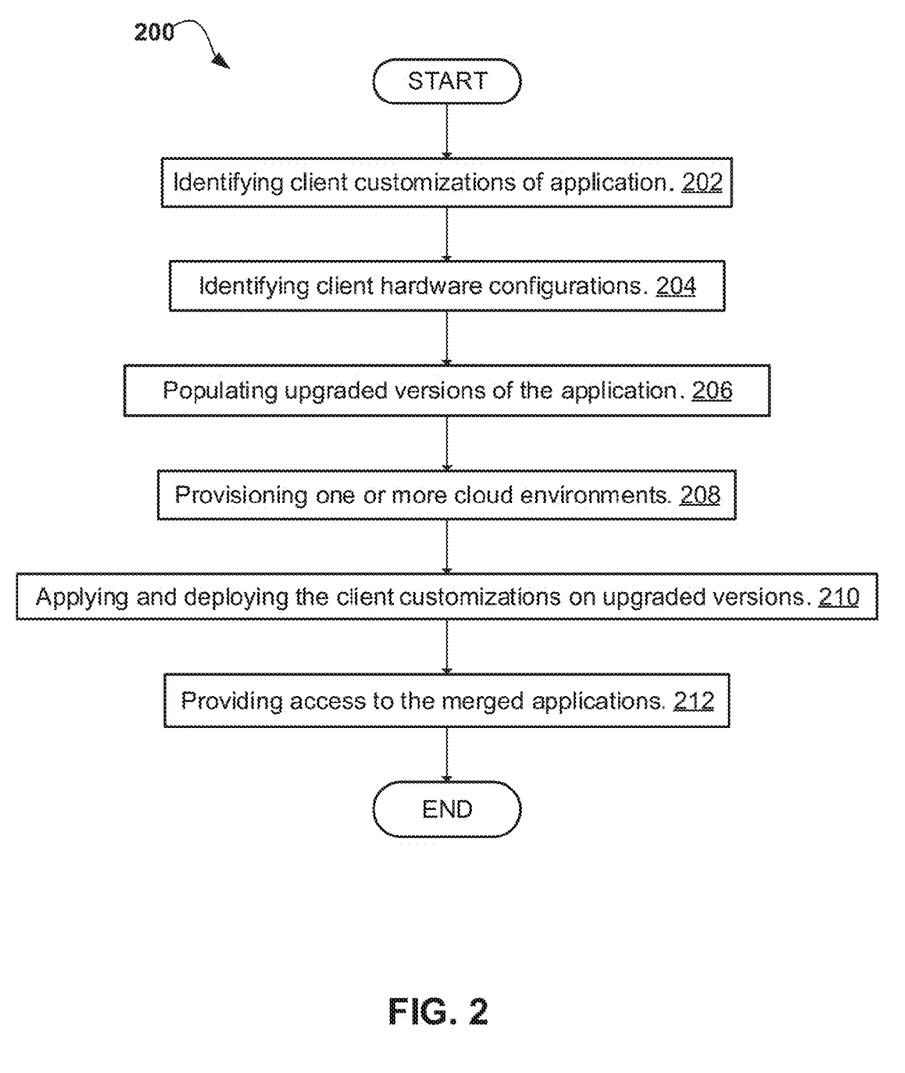
FIG. 2 is an operational flowchart illustrating the steps carried out by a program for providing a plurality customized remote environments for application performance testing.

Referring now to FIG. 2, an operational flowchart 200 illustrating the steps carried out by a program for providing cloud accessible testing environments to test the application performance of client customizations of an application deployed on one or more updated versions of the application is depicted. At 202, the application performance testing program 108A, 108B (FIG. 1) may identify the client customizations of the customized application on the client computer 102 (FIG. 1). As cross-referenced, the present embodiment may utilize the analysis results generated with respect to the application entitled, "AUTOMATED COMPUTER APPLICATION UPDATE ANALYSIS", incorporated by reference herein, to identify the client customizations of the customized application. For example, client computer 102 (FIG. 1) may run the customized application, USERAPP_SERVICE_4.0. Thus, the application performance testing program 108A, 108B (FIG. 1) may import the generated analysis results, which may be an .xml file, to identify the client customizations of the customized application, and to analyze the merging of the client customizations of the customized application with the different upgraded versions of the customized application.

Then, at 204, the application performance testing program 108A, 108B (FIG. 1) may identify the client hardware configurations. As previously described at step 202, the application performance testing program 108A, 108B (FIG. 1) may utilize the analysis results generated with respect to the application entitled, "AUTOMATED COMPUTER APPLICATION UPDATE ANALYSIS". For example, the application performance testing program 108A, 108B (FIG. 1) may utilize the generated analysis results, which may be an .xml file, to also identify the client computer 102 (FIG. 1) hardware configurations, which may include, but are not limited to, the size and speed of RAM, the processor quantity and speed, the processor version/generation, the hard drive quantity and speed, and the flash capacity.

Next, at 206, the application performance testing program 108A, 108B (FIG. 1) may populate upgraded versions of the customized application. Therefore, based on the analysis results generated with respect to the application entitled, "AUTOMATED COMPUTER APPLICATION UPDATE ANALYSIS", the application performance testing program 108A, 108B (FIG. 1) may intelligently populate and recommend different upgraded versions of the customized application to apply the client customizations. Furthermore, the application performance testing program 108A, 108B (FIG. 1) may generate a list of the upgraded versions of the customized application to allow users/administrators to select the upgraded versions to apply the client customizations of the customized application.

For example, the upgraded versions—USERAPP_NEW_SERVICE_5.0, USERAPP_NEW_SERVICE_6.0, and USERAPP_NEW_SERVICE_7.0—may be available upgrades to the customized application, USERAPP_SERVICE_4.0. Thus, based on the identified client customizations of the customized application and the identified client hardware configurations, the application performance testing program 108A, 108B (FIG. 1) may present a page of links recommending the upgraded versions of the client customized application to deploy with the client customizations. For example, the application performance testing program 108A, 108B (FIG. 1) may recommend the upgraded versions—USERAPP_NEW_SERVICE_6.0 and USERAPP_NEW_SERVICE_7.0—for the client customizations of the customized application. Also, the application performance testing program 108A, 108B (FIG. 1) may present a link to the upgraded version, USERAPP_NEW_SERVICE_5.0, to allow the user to choose that upgraded version of the customized application as well. Therefore, the user may select one or more of the upgraded versions—USERAPP_NEW_SERVICE_5.0, USERAPP_NEW_SERVICE_6.0, and USERAPP_NEW_SERVICE_7.0.

Then, at 208, the application performance testing program 108A, 108B (FIG. 1) may provision one or more cloud environments. Specifically, the application performance testing program 108A, 108B (FIG. 1) may utilize one or more cloud services to provide one or more cloud environments, or cloud servers, having different hardware and software platforms. For example, the application performance testing program 108A, 108B (FIG. 1) may utilize the cloud service, IBM Softlayer® (IBM Softlayer and all IBM Softlayer-based trademarks and logos are trademarks or registered trademarks of IBM and/or its affiliates), to provide servers having 2CPUs, 20 GB RAM, 3 TB Raid 5 storage, Windows 2012 R2 server OS, and Apache Web Server 2.4.12. Additional hardware and software platforms may include, but are not limited to, Linux® (Linux and all Linux-based trademarks and logos are trademarks or registered trademarks of Linus Torvalds and/or affiliates) on IBM Power Systems® (IBM Power Systems and all IBM Power Systems-based trademarks and logos are trademarks or registered trademarks of IBM and/or its affiliates), Linux® on IBM z Systems® (IBM z Systems and all IBM z Systems-based trademarks and logos are trademarks or registered trademarks of IBM and/or its affiliates), and Windows® (Windows and all Windows-based trademarks and logos are trademarks or registered trademarks of Microsoft and/or its affiliates) on IBM Power Systems®. Furthermore, the application performance testing program 108A, 108B (FIG. 1) may recommend different hardware and software platforms, as well as allow a user to choose the different hardware and software platforms for the one or more provisioned cloud environments.

Next, at 210 the application performance testing program 108A, 108B (FIG. 1) may apply and deploy the client customizations on the upgraded versions. As previously described at step 202, the application performance testing program 108A, 108B (FIG. 1) may identify the client customizations of the customized application on the client computer 102 (FIG. 1). Thereafter, at step 206, the application performance testing program 108A, 108B (FIG. 1) may detect user selection of the upgraded versions of the customized application to deploy with the client customizations. As such, the application performance testing program 108A, 108B (FIG. 1) may apply the client customizations of the customized application to the one or more upgraded versions of the customized application, and thereby merge the client customizations on the upgraded versions. Furthermore, the application performance testing program 108A, 108B (FIG. 1) may thereby deploy the one or more merged applications on the one or more provisioned cloud environments.

For example, client computer 102 (FIG. 1) may include customized application USERAPP_SERVICE_4.0. The application performance testing program 108A, 108B (FIG. 1) may identify the client customizations of the customized application and the client hardware configurations of client computer 102 (FIG. 1). Additionally, the application performance testing program 108A, 108B (FIG. 1) may populate and recommend upgraded versions of the customized application, such as USERAPP_NEW_SERVICE_6.0 and USERAPP_NEW_SERVICE_7.0, and the users/administrators may select one or more of the upgraded versions. Furthermore, the application performance testing program 108A, 108B (FIG. 1) may utilize cloud services, such as IBM Softlayer®, to provision one or more cloud environments, and to allow users/administrators to select different hardware and software platforms, such as Windows® on IBM Power Systems® and Linux® on IBM z Systems®, for the cloud environments. Thereafter, the application performance testing program 108A, 108B (FIG. 1) may apply the client customizations of the customized application, USERAPP_SERVICE_4.0, to the upgraded versions of the client customized application, USERAPP_NEW_SERVICE_6.0 and USERAPP_NEW_SERVICE_7.0, and deploy the merged applications on the one or more provisioned cloud environments having different hardware and software platforms, such as Windows® on IBM Power Systems® and Linux® on IBM z Systems®.

Then, at 212, the application performance testing program 108A, 108B (FIG. 1) may provide temporary access to the merged applications. Specifically, the application performance testing program 108A, 108B (FIG. 1) may provide temporary access to the one or more provisioned cloud environments deploying the merged applications for the users/administrators. Furthermore, the application performance testing program 108A, 108B (FIG. 1) may analyze the merged applications performance, and allow users/administrators to do benchmark testing and custom testing of the merged applications. For example, via the one or more provisioned cloud environments, the application performance testing program 108A, 108B (FIG. 1) may upgrade the customized application on client computer 102 (FIG. 1) to one or more of the upgraded versions of the customized application while maintaining the client customizations of the customized application. As previously described at step 204, the application performance testing program 108A, 108B (FIG. 1) may identify the hardware configurations of the client computer 102 (FIG. 1). Therefore, according to one embodiment, the application performance testing program 108A, 108B (FIG. 1) may determine whether hardware configurations different from the hardware configurations of the client computer 102 (FIG. 1) may improve the merged application performance. Furthermore, the application performance testing program 108A, 108B (FIG. 1) may determine whether different software configurations may improve the merged application performance. Thus, the application performance testing program 108A, 108B (FIG. 1) may allow users/administrators to access the merged applications, determine the merged applications that fit their needs, and determine whether changes in the hardware and software may improve the merged applications performance before committing money and manpower to the upgraded versions.

It may be appreciated that FIG. 2 provides only an illustration of one implementation and does not imply any limitations with regard to how different embodiments may be implemented. Many modifications to the depicted environments may be made based on design and implementation requirements. For example, according to one implementation, the application performance testing program 108A, 108B (FIG. 1) may leverage a cloud management service, such as IBM Cloud Orchestrator® to implement the operational flowchart 200 (FIG. 2) previously described. Also, a user using a computer, such as client computer 102 (FIG. 1), may use a software application program 114 (FIG. 1), such as Firefox® (Firefox and all Firefox-based trademarks and logos are trademarks or registered trademarks of Mozilla and/or its affiliates), that interacts with the application performance testing program 108A, 108B (FIG. 1), and a database 116 (FIG. 1), to implement the operational flowchart 200 (FIG. 2) previously described. Furthermore, the application performance testing program 108A, 108B (FIG. 1) may further allow users/administrators to purchase licenses for the software and hardware needed to implement the selected upgraded versions of the customized application having the client customizations, migrate client data from the customized application to the new upgraded merged version of the customized application, and seamlessly switch users from the customized application to the merged application to effectively upgrade the customized application on demand and on one or more environments.

Figure 3:
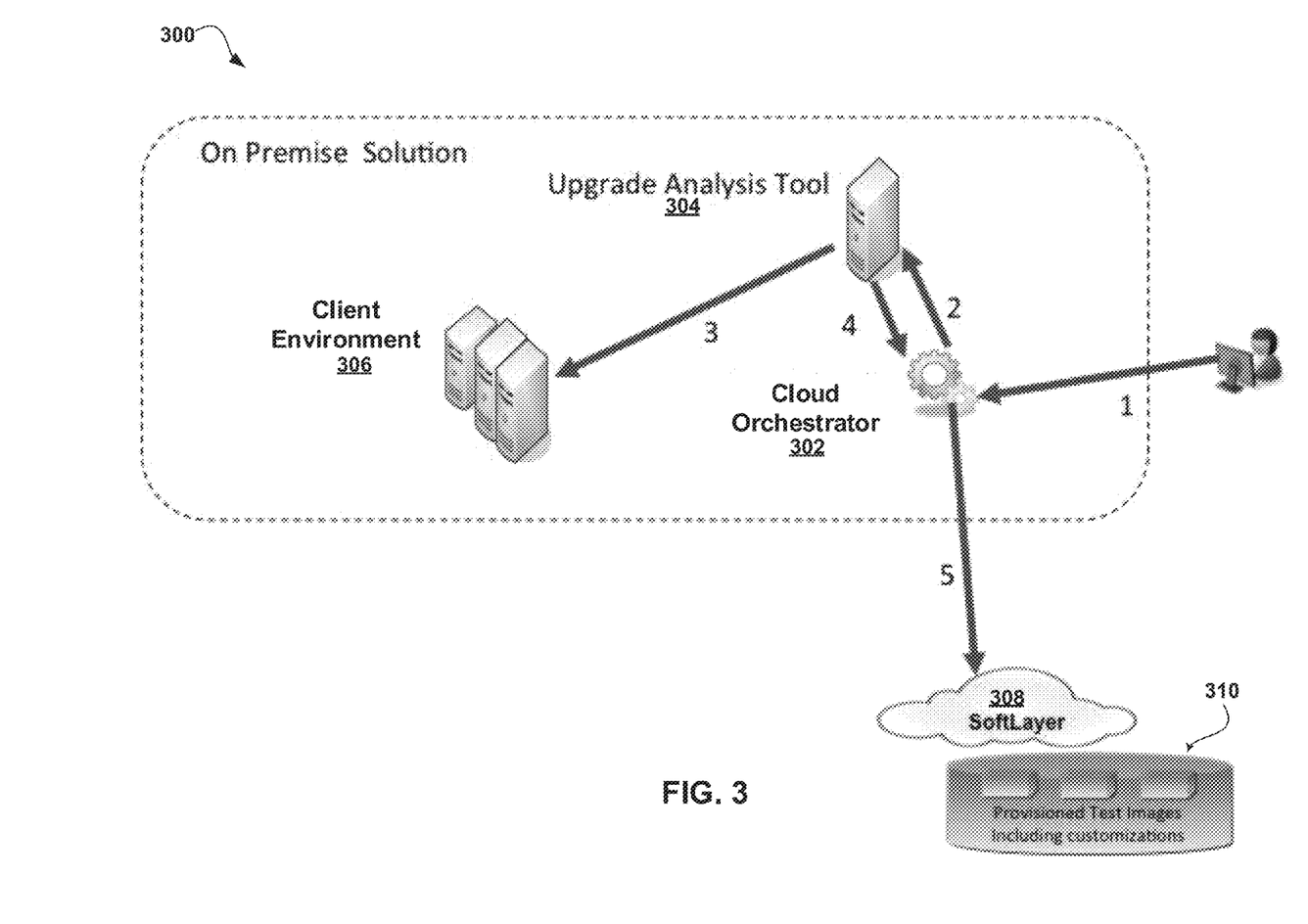
FIG. 3 is a block diagram illustrative of one embodiment of a program for providing a plurality customized remote environments for application performance testing.

Referring now to FIG. 3, a block diagram 300 illustrative of one embodiment of the present invention is depicted. As previously described, and according to one implementation, the application performance testing program 108A, 108B (FIG. 1) may leverage a cloud management service, such as IBM Cloud Orchestrator® (IBM Cloud Orchestrator and all IBM Cloud Orchestrator-based trademarks and logos are trademarks or registered trademarks of IBM and/or its affiliates) to implement the operational flowchart 200 (FIG. 2) described above. In step 1, users/administrators may initiate the application performance testing program 108A, 108B (FIG. 1) utilizing IBM Cloud Orchestrator® 302. In step 2, the application performance testing program 108A, 108B (FIG. 1) may utilize IBM Cloud Orchestrator® 302 to initiate the upgrade analysis tool 304 of the application entitled, "AUTOMATED COMPUTER APPLICATION UPDATE ANALYSIS", incorporated by reference herein. In step 3, the upgrade analysis tool 304 may analyze the software and hardware implemented at the client environment 306. In step 4, the application performance testing program 108A, 108B (FIG. 1) may receive analysis results, and a test plan may be created that includes possible platforms, configurations, and upgraded versions to test the client customizations of the customized application. Furthermore, the application performance testing program 108A, 108B (FIG. 1) may provide an opportunity for the user to edit the test plan or make changes. In step 5, the application performance testing program 108A, 108B (FIG. 1) may utilize IBM Cloud Orchestrator® 302 to initiate the cloud testing environments 310 on a cloud providing service, such as IBM Softlayer® 308. Additionally, the cloud testing environments 310 may deploy the upgraded versions of the customized application with the client customizations applied. Furthermore, the application performance testing program 108A, 108B (FIG. 1) may provide testing and recommendations to the users/administrators.

Figure 4:
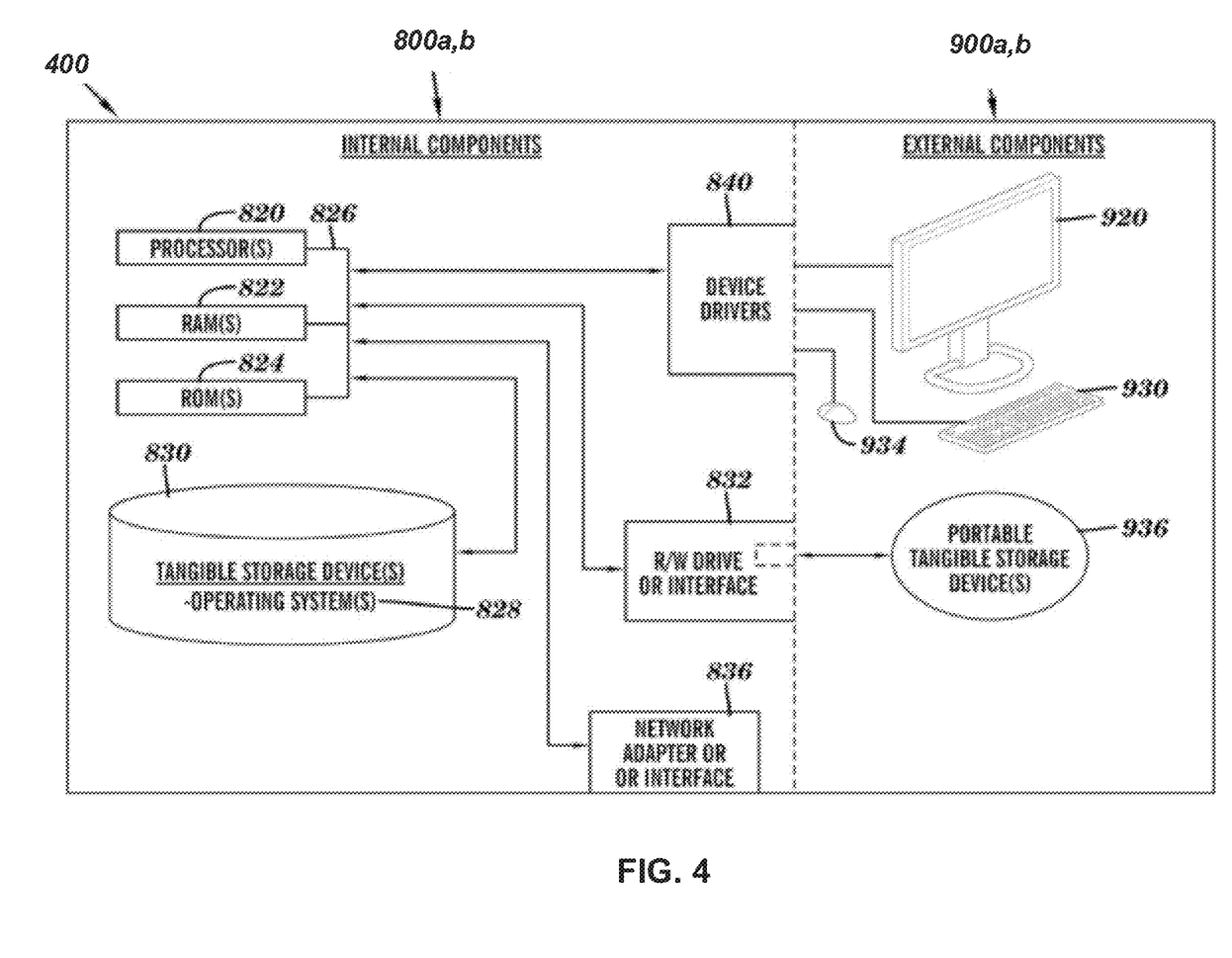
FIG. 4 is a block diagram of the system architecture of a program for providing a plurality customized remote environments for application performance testing.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800 *a, b* and external components 900 *a, b* illustrated in FIG. 4. Each of the sets of internal components 800 *a, b* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, the software program 114 (FIG. 1), the application performance testing program 108A (FIG. 1) in client computer 102 (FIG. 1), and the application performance testing program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 *a, b*, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as application performance testing program 108A and 108B (FIG. 1), can be stored on one or more of the respective portable computer-readable tangible storage devices 936, read via the respective R/W drive or interface 832 and loaded into the respective hard drive 830.

Each set of internal components 800 *a, b* also includes network adapters or interfaces 836 such as a TCP/IP adapter cards, wireless Wi-Fi interface cards, or 3G or 4G wireless interface cards or other wired or wireless communication links. The application performance testing program 108A (FIG. 1) and software program 114 (FIG. 1) in client computer 102 (FIG. 1), and application performance testing program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the application performance testing program 108A (FIG. 1) and software program 114 (FIG. 1) in client computer 102 (FIG. 1) and the application performance testing program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 *a, b* can include a computer display monitor 920, a keyboard 930, and a computer mouse 934. External components 900 *a, b* can also include touch screens, virtual keyboards, touch pads, pointing devices, and other human interface devices. Each of the sets of internal components 800 *a, b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
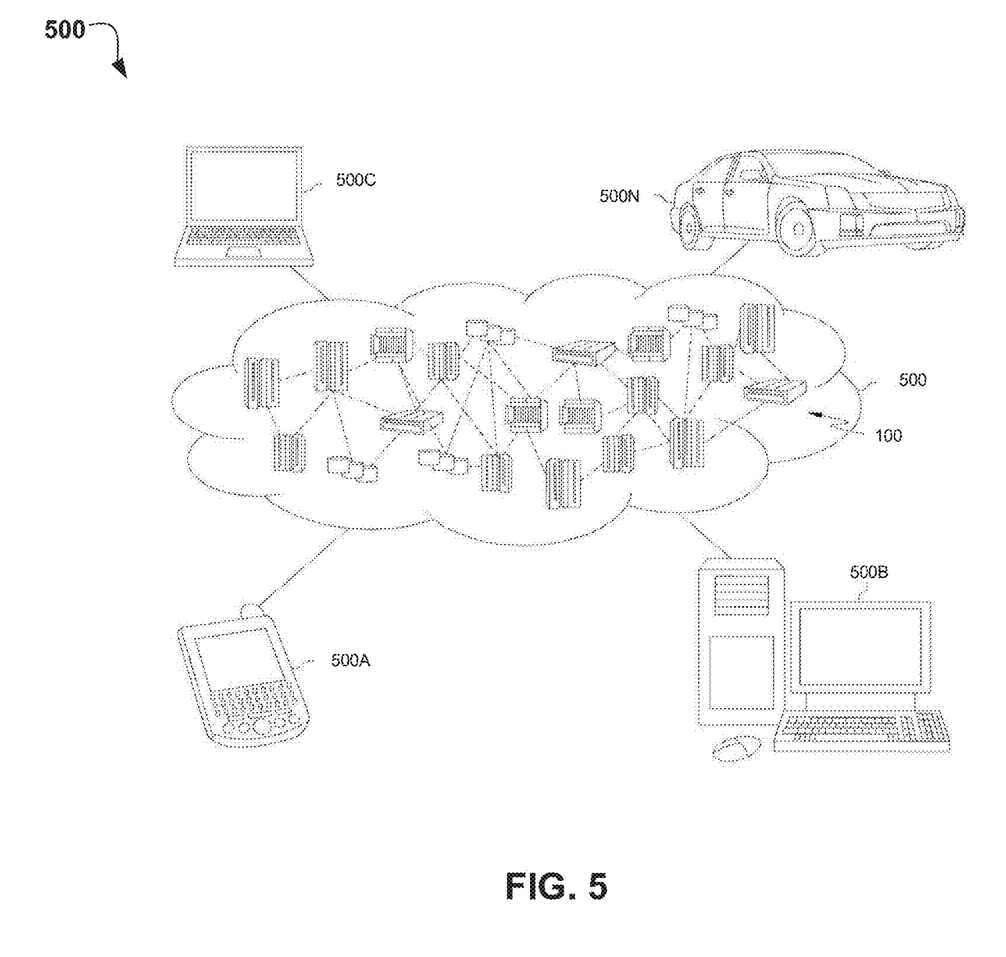
FIG. 5 is a block diagram of an illustrative cloud computing environment including the computer system depicted in FIG. 1, in accordance with an embodiment of the present disclosure.

Referring now to FIG. 5, illustrative cloud computing environment 500 is depicted. As shown, cloud computing environment 500 comprises one or more cloud computing nodes 100 with which local computing devices used by cloud consumers, such as, for example, personal digital assistant (PDA) or cellular telephone 500A, desktop computer 500B, laptop computer 500C, and/or automobile computer system 500N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 100 and cloud computing environment 500 can communicate with any type of computerized device over any type of network and/or network addressable connection (e.g., using a web browser).

Figure 6:
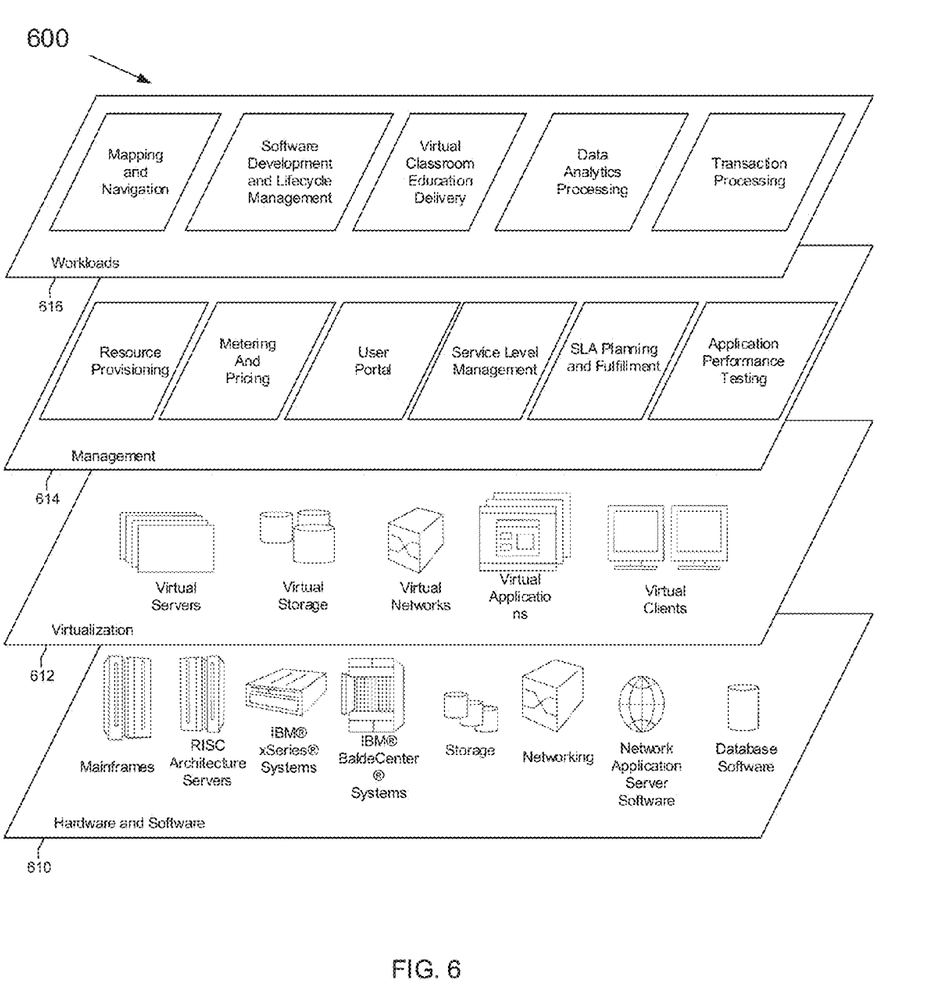
FIG. 6 is a block diagram of functional layers of the illustrative cloud computing environment of FIG. 5, in accordance with an embodiment of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 610 includes hardware and software components. Examples of hardware components include: mainframes; RISC (Reduced Instruction Set Computer) architecture based servers; storage devices; networks and networking components. In some embodiments, software components include network application server software.

Virtualization layer 612 provides an abstraction layer from which the following examples of virtual entities may be provided: virtual servers; virtual storage; virtual networks, including virtual private networks; virtual applications and operating systems; and virtual clients.

In one example, management layer 614 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. An Application Performance Testing program may provide cloud accessible testing environments for testing client customizations of customized applications deployed on one or more updated versions of the customized applications.

Workloads layer 616 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing a plurality of customized cloud environments for application performance testing, the method comprising:
    identifying a plurality of client customizations associated with at least one client application;
    identifying a plurality of client hardware configurations associated with the at least one client application;
    populating a plurality of upgraded versions of the at least one client application, wherein the populating is based on the at least one client application;
    provisioning at least one cloud environment based on the populated plurality of upgraded versions;
    enabling users to select one or more upgraded versions associated with the populated plurality of upgraded versions, and to select a plurality of hardware configurations that are different from the plurality of client hardware configurations, to deploy on the at least one cloud environment for testing;
    applying the identified plurality of client customizations associated with the at least one client application to the selected one or more upgraded versions and the selected plurality of hardware configurations;
    deploying the selected one or more upgraded versions and the selected plurality of hardware configurations on the at least one cloud environment;
    identifying a plurality of hardware and a plurality of software that improves performance of the deployed one or more upgraded versions; and
    migrating a plurality of client application data to at least one environment, wherein the at least one environment comprises a software license and a hardware license associated with the deployed one or more upgraded versions of the at least one client application.

2. The method of claim 1, further comprising:
    providing access to the deployed one or more upgraded versions of the at least one client application.

3. The method of claim 1, wherein the identified plurality of client hardware configurations comprises at least one of a size and a speed of RAM, a processor quantity and a speed, a processor version or a generation, a hard drive quantity and a speed, and a flash capacity.

4. The method of claim 1, further comprising:
    enabling a plurality of benchmark testing and a plurality of customized testing of the deployed one or more upgraded versions of the at least one client application.

5. A computer system for providing a plurality of customized cloud environments for application performance testing, comprising:
    one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
    identifying a plurality of client customizations associated with at least one client application;
    identifying a plurality of client hardware configurations associated with the at least one client application;
    populating a plurality of upgraded versions of the at least one client application, wherein the populating is based on the at least one client application;
    provisioning at least one cloud environment based on the populated plurality of upgraded versions;
    enabling users to select one or more upgraded versions associated with the populated plurality of upgraded versions, and to select a plurality of hardware configurations that are different from the plurality of client hardware configurations, to deploy on the at least one cloud environment for testing;
    applying the identified plurality of client customizations associated with the at least one client application to the selected one or more upgraded versions and the selected plurality of hardware configurations;
    deploying the selected one or more upgraded versions and the selected plurality of hardware configurations on the at least one cloud environment;
    identifying a plurality of hardware and a plurality of software that improves performance of the deployed one or more upgraded versions; and
    migrating a plurality of client application data to at least one environment, wherein the at least one environment comprises a software license and a hardware license associated with the deployed one or more upgraded versions of the at least one client application.

6. The computer system of claim 5, further comprising:
    providing access to the deployed one or more upgraded versions of the at least one client application.

7. The computer system of claim 5, wherein the identified plurality of client hardware configurations comprises at least one of a size and speed of RAM, a processor quantity and speed, a processor version/generation, a hard drive quantity and speed, and a flash capacity.

8. The computer system of claim 5, further comprising:
    enabling a plurality of benchmark testing and a plurality of customized testing of the deployed one or more upgraded versions of the at least one client application.

9. A computer program product for providing a plurality of customized cloud environments for application performance testing, comprising:
one or more computer-readable storage devices and program instructions stored on at least one of the one or more tangible storage devices, the program instructions executable by a processor, the program instructions comprising:
program instructions to identify a plurality of client customizations associated with at least one client application;
program instructions to identify a plurality of client hardware configurations associated with the at least one client application;
program instructions to populate a plurality of upgraded versions of the at least one client application, wherein the populating is based on the at least one client application;
program instructions to provision at least one cloud environment based on the populated plurality of upgraded versions;
program instructions to enable users to select one or more upgraded versions associated with the populated plurality of upgraded versions, and to select a plurality of hardware configurations that are different from the plurality of client hardware configurations, to deploy on the at least one cloud environment for testing;
program instructions to apply the identified plurality of client customizations associated with the at least one client application to the selected one or more upgraded versions and the selected plurality of hardware configurations;
program instructions to deploy the selected one or more upgraded versions and the selected plurality of hardware configurations on the at least one cloud environment;
program instructions to identify a plurality of hardware and a plurality of software that improves performance of the deployed one or more upgraded versions; and
program instructions to migrate a plurality of client application data to at least one environment, wherein the at least one environment comprises a software license and a hardware license associated with the deployed one or more upgraded versions of the at least one client application.

10. The computer program product of claim 9, wherein the plurality of client hardware configurations comprises at least one of a size and speed of RAM, a processor quantity and speed, a processor version/generation, a hard drive quantity and speed, and a flash capacity.

11. The computer program product of claim 9, further comprising:
program instructions to enable a plurality of benchmark testing and a plurality of customized testing of the deployed one or more upgraded versions of the at least one client application.

* * * * *